(12) United States Patent
Moss et al.

(10) Patent No.: US 10,226,831 B2
(45) Date of Patent: Mar. 12, 2019

(54) TAP HOLDER FOR MULTIPLE TAP SIZES

(71) Applicant: BLACK & DECKER INC., New Britain, CT (US)

(72) Inventors: Darren B. Moss, York, PA (US); Gregory R. Keier, Towson, MD (US)

(73) Assignee: BLACK & DECKER INC., New Britain, CT (US)

(*) Notice: Subject to any disclaimer, the term of this patent is extended or adjusted under 35 U.S.C. 154(b) by 74 days.

(21) Appl. No.: 15/139,621

(22) Filed: Apr. 27, 2016

(65) Prior Publication Data
US 2017/0312839 A1 Nov. 2, 2017

(51) Int. Cl.
*B23B 31/173* (2006.01)
*B23G 1/46* (2006.01)
(Continued)

(52) U.S. Cl.
CPC .......... *B23G 1/46* (2013.01); *B23B 31/16162* (2013.01); *B23B 31/16166* (2013.01);
(Continued)

(58) Field of Classification Search
CPC ............... B23G 1/46; Y10T 279/17299; Y10T 279/17461; Y10T 279/17504;
(Continued)

(56) References Cited

U.S. PATENT DOCUMENTS 1,392,705 A 10/1921 Rhodes
1,463,176 A * 7/1923 Schieldge ............. B23B 31/201
279/147

(Continued)

FOREIGN PATENT DOCUMENTS

FR 1289371 A 3/1962
GB 198452 A * 6/1923 ............. B23B 31/12
(Continued)

OTHER PUBLICATIONS

Rilliard, Arnaud—Extended European Search Report—dated Sep. 29, 2017—10 pages—European Patent Office—The Hague.

*Primary Examiner* — Eric A Gates
*Assistant Examiner* — Chwen-Wei Su
(74) *Attorney, Agent, or Firm* — Scott B. Markow

(57) ABSTRACT

A tap holder includes a body extending along an axis and having a front end portion defining a front opening and an externally threaded portion. A gripping assembly includes a spring having first and second legs, a first jaw mounted to the first leg, and a second jaw mounted to the second leg. Each jaw has a tapered outer wall and an inner wall with the inner walls of the jaws facing each other. A sleeve has an internally threaded bore threadably received on the externally threaded portion of the body, and an inner tapered surface configured to abut the tapered outer walls of the first and second jaws. As the sleeve is rotated relative to the body, a distance between the first and second gripping surfaces may be adjusted for gripping a tap between the inner walls of the first and second jaws. Each of the inner walls includes first and second gripping surfaces, the first gripping surfaces defining a first width therebetween for gripping taps having a first range of head sizes, and the second gripping surfaces defining a larger second width therebetween for gripping taps having a second, different range of head sizes.

15 Claims, 6 Drawing Sheets

(51) Int. Cl.
  *B23G 1/26* (2006.01)
  *B25G 1/00* (2006.01)
  *B25B 13/44* (2006.01)
  *B25B 13/48* (2006.01)
  *B23B 31/103* (2006.01)
  *B23B 31/08* (2006.01)

(52) U.S. Cl.
  CPC .............. *B23G 1/261* (2013.01); *B25B 13/44* (2013.01); *B25B 13/48* (2013.01); *B25G 1/005* (2013.01); *B23B 31/08* (2013.01); *B23B 31/103* (2013.01); *B23B 2231/54* (2013.01); *Y10T 279/17581* (2015.01)

(58) Field of Classification Search
  CPC ............. Y10T 24/3969; Y10T 24/3978; Y10T 279/17581; B23B 31/103; B23B 31/16162; B23B 31/08; B23B 31/107; B23B 2231/04; B23B 2231/54; B23B 2231/2043; B23B 2231/2045; B23B 2231/2086
  USPC .......................................................... 16/373
  See application file for complete search history.

(56) References Cited

U.S. PATENT DOCUMENTS

| | | | | |
|---|---|---|---|---|
| 1,559,088 A | * | 10/1925 | Gunnerson | A61N 5/0603 279/56 |
| 1,593,908 A | | 7/1926 | Miller | |
| 1,679,299 A | * | 7/1928 | Fegley | B23B 31/1253 279/56 |
| 1,880,521 A | * | 10/1932 | Stowell | B23B 31/1253 279/36 |
| 2,141,786 A | | 12/1938 | Helgerud | |
| 2,147,203 A | | 2/1939 | Kylin | |
| 3,553,753 A | | 1/1971 | Hundley | |
| 3,738,768 A | * | 6/1973 | Kuhn | B25B 13/44 279/42 |
| 3,767,217 A | | 10/1973 | Jensen | |
| 4,080,090 A | | 3/1978 | Kern | |
| 4,799,832 A | | 1/1989 | Abbott | |
| 4,934,221 A | | 6/1990 | Hsiao | |
| 5,218,890 A | | 6/1993 | Christ, Jr. | |
| 6,742,786 B2 | * | 6/2004 | Casel | B23B 31/16166 279/123 |
| 6,945,145 B1 | * | 9/2005 | Kesinger | B23B 31/207 279/42 |
| 7,571,517 B2 | | 8/2009 | Smith et al. | |
| 8,375,831 B2 | | 2/2013 | Steinweg et al. | |
| 8,813,612 B2 | | 8/2014 | Steinweg et al. | |
| 8,844,941 B1 | | 9/2014 | Dickrede | |
| 2008/0056834 A1 | | 3/2008 | McAuliffe | |
| 2009/0308209 A1 | | 12/2009 | Cross et al. | |

FOREIGN PATENT DOCUMENTS

| | | |
|---|---|---|
| JP | H0453624 A | 2/1992 |
| JP | H0453625 A | 2/1992 |
| JP | H09155639 A | 6/1997 |

\* cited by examiner

TAP HOLDER FOR MULTIPLE TAP SIZES

TECHNICAL FIELD

This application relates to holder for holding multiple sizes of taps.

BACKGROUND

Taps are used to cut threaded holes in workpieces such as metal sheets and plates. A tap generally has a polygonal (e.g., square) head, an intermediate shank, and a threaded working end used to cut (or tap) threads in a hole. A tap may be gripped by a tap holder to facilitate coupling the tap to a hand tool or a power tool. However, existing tap holders are limited in the range of sizes of taps that the tap holder is able to receive. This requires users to purchase several different sizes of tap holders, which is both costly and inconvenient.

SUMMARY

In an aspect, a tap holder includes a body extending along an axis and having a front end portion defining a front opening and an externally threaded portion. A gripping assembly includes a spring having first and second legs, a first jaw mounted to the first leg, and a second jaw mounted to the second leg. Each jaw has a tapered outer wall and an inner wall with the inner walls of the jaws facing each other. A sleeve has an internally threaded bore threadably received on the externally threaded portion of the body, and an inner tapered surface configured to abut the tapered outer walls of the first and second jaws. As the sleeve is rotated relative to the body, a distance between the first and second gripping surfaces may be adjusted for gripping a tap between the inner walls of the first and second jaws. Each of the inner walls includes first and second gripping surfaces, the first gripping surfaces defining a first width therebetween for gripping taps having a first range of head sizes, and the second gripping surfaces defining a larger second width therebetween for gripping taps having a second, different range of head sizes.

Implementations of this aspect may include one or more of the following features. The tap holder may include a rod-shaped handle received in a cross-bore defined in the body transverse to the axis. The handle may include a plurality of recesses along its length and the body may include a detent projecting into the cross-bore to engage the recesses to adjust a transverse position of the handle relative to the body. The body may define an axial socket in a rear end of the body for receiving a driving tool. The socket may have a polygonal cross-section. The spring may be a wire spring. The wire spring may be generally U-shaped with a cross-bar and the legs attached to ends of the cross-bar. Each leg may have a first section extending axially forward and radially inward from the cross-bar at a first angle, a second section extending axially forward and radially outward from the first section at a second angle, and a third section extending axially forward and radially outward from the second section at a third angle. Each of the first gripping surfaces and each of the second gripping surfaces ma be V-shaped for gripping square heads of taps. The second gripping surfaces may be positioned closer to the front end of the body than the first gripping surfaces. A step may be defined between each of the first gripping surfaces and the second gripping surfaces. The first gripping surfaces are configured to hold taps having head widths of less than or equal to 5 mm, e.g., approximately 2 mm to 5 mm. The second gripping surfaces may configured to hold taps having head widths of greater than or equal to 4 mm, e.g., approximately 4 mm to 7 mm.

In another aspect, a tap holder includes a body extending along an axis and having a front end portion defining a front opening and an externally threaded portion. A gripping assembly includes a generally U-shaped wire spring having a cross-bar and first and second legs at ends of the cross-bar, a first jaw mounted to the first leg, and a second jaw mounted to the second leg. Each jaw has a tapered outer wall and an inner wall with the inner walls of the jaws facing each other. A sleeve has an internally threaded bore threadably received on the externally threaded portion of the body, and an inner tapered surface configured to abut the tapered outer walls of the first and second jaws. As the sleeve is rotated relative to the body, a distance between the first and second gripping surfaces may be adjusted for gripping a tap between the inner walls of the first and second jaws. Each leg has a first section extending axially forward and radially inward from the cross-bar at a first angle a second section extending axially forward and radially outward from the first section at a second angle, and a third section extending axially forward and radially outward from the second section at a third angle.

Implementations of this aspect may include one or more of the following features Each of the inner walls may include first and second gripping surfaces. The first gripping surfaces may define a first width threbetween for gripping taps having a first range of head sizes, and the second gripping surfaces may define a larger second width therebetween for gripping taps having a second, different range of head sizes. Each of the first gripping surfaces and each of the second gripping surfaces may be V-shaped for gripping square heads of taps therebetween. The second gripping surfaces may be positioned closer to the front end of the body than the first gripping surfaces Advantages may include one or more of the following. For example, the multiple gripping surfaces of differing widths enable a single tap holder to hold taps having multiple ranges of tap head sizes, enabling the user to use a single tap holder for a wider range of taps. The shape of the legs of the spring facilitate improved retention of the jaws on the spring. These and other advantages and features will be apparent from the description, the drawings, and the claims.

DETAILED DESCRIPTION

Figure 1:
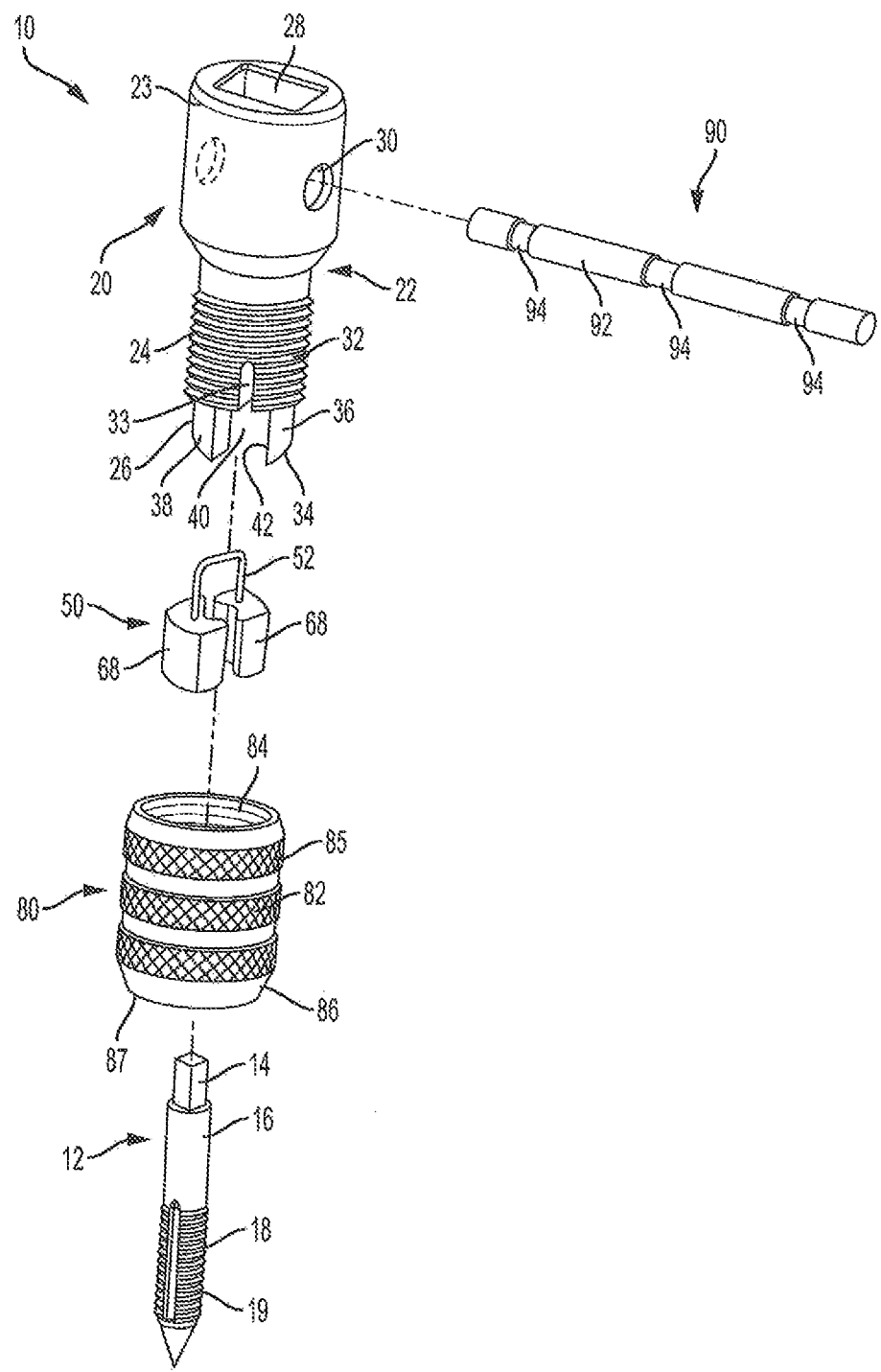
FIG. 1 is an exploded perspective view of an exemplary embodiment of a tap holder and tap.
Figure 2:
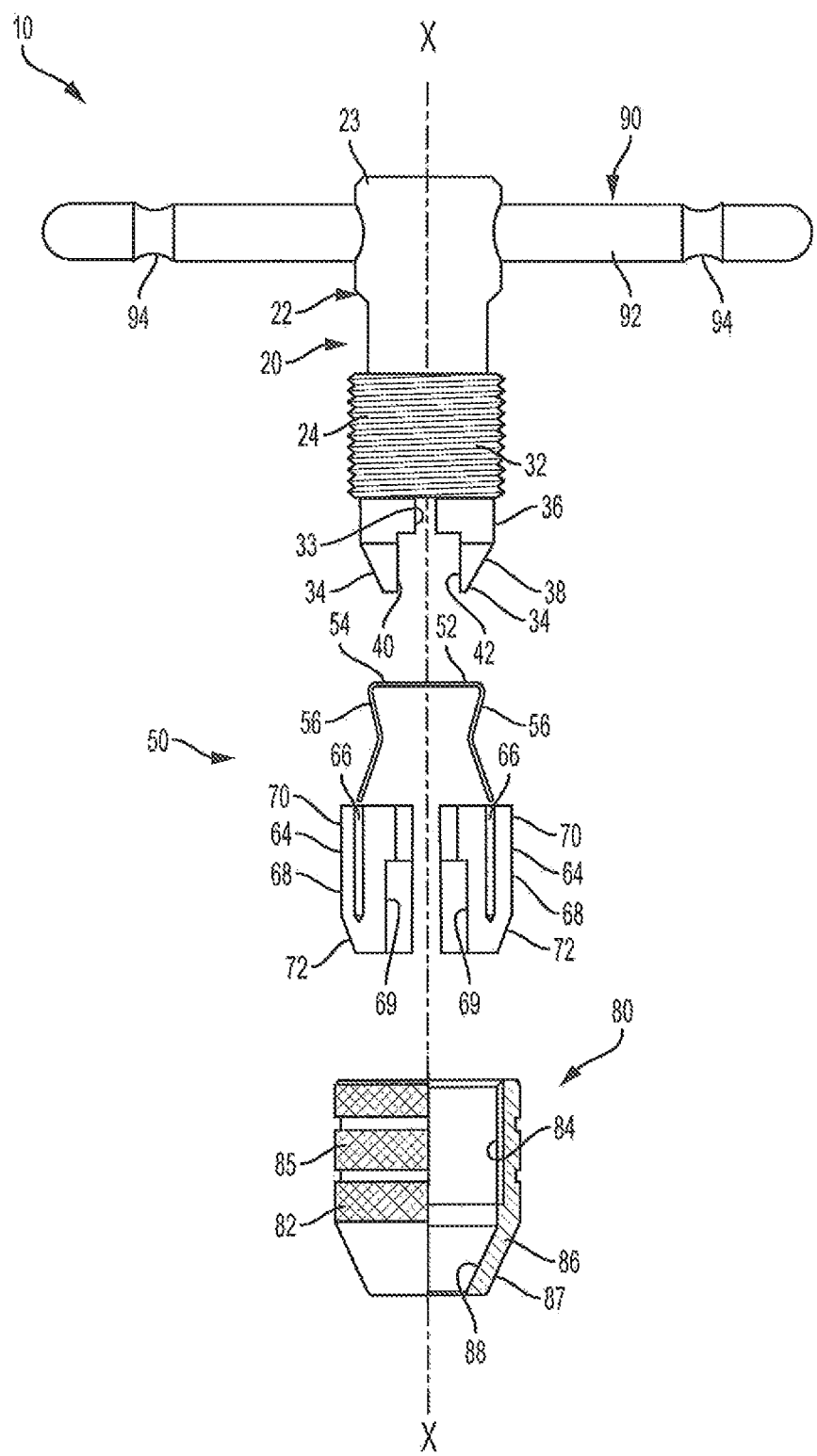
FIG. 2 is an exploded side view of the tap holder of FIG. 1.

Referring to FIGS. 1 and 2, in one implementation, a tap holder 10 includes a generally cylindrical body 20, a gripping assembly 50, an adjustment sleeve 80, and a handle 90. The tap holder 10 is adapted to hold a plurality of different sized taps 12. Each tap 12 includes a polygonal (e.g., square) head 14, an intermediate shank 16 and a front tapping portion 18 having a plurality of threads 19 adapted to cut a threaded hole in a workpiece.

Figure 3B:
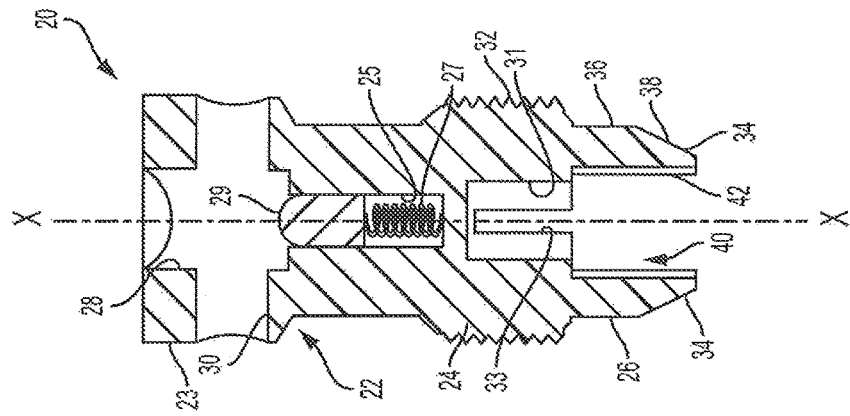
FIG. 3B is a cross-sectional view of the body of FIG. 3A.
Figure 3A:
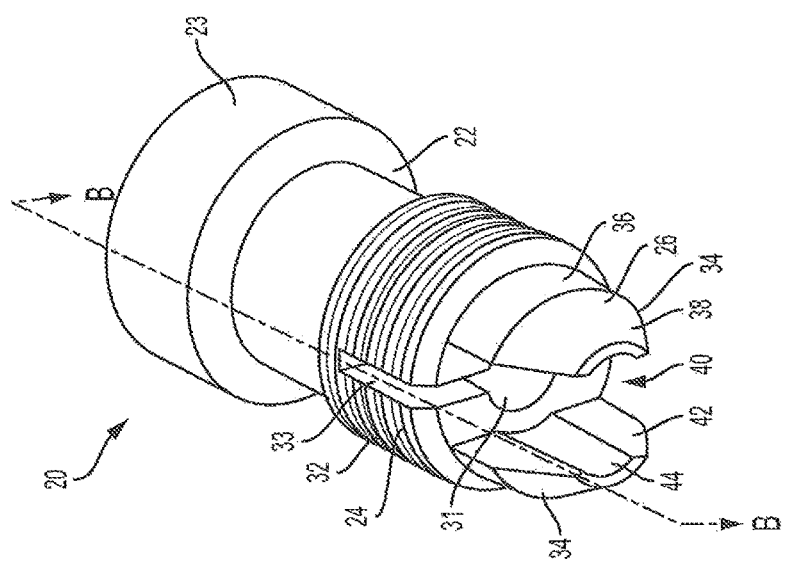
FIG. 3A is a perspective view of a body of the tap holder of FIG. 1.

Referring also to FIGS. 3A and 3B, the body 20 extends generally along an axis X and includes a rear portion 22, an intermediate portion 24, and a front portion 26. The rear portion 22 includes an enlarged head 23 that defines an axially extending polygonal (e.g., square) socket 28 configured to receive a driving tool such as a square head of a socket wrench or impact wrench. The handle 90 comprises a rod-shaped shaft 92 having a plurality of annular recesses 94 at different locations along the length of the shaft 92. The enlarged head 23 includes a transverse throughbore 30 for receiving the handle 90. The rear portion 22 also defines an axial bore 25 that receives a spring 27 and a detent ball or pin 29 that is configured to project partially into the throughbore 30 for engaging the recesses 94 in the handle 90. In this manner, the handle 90 can be retained in the cylindrical body 20 at a plurality transverse positions as determined by the positions of the annular recesses 94.

The intermediate portion 24 of the body 20 comprises a cylindrical bore 31, a transverse slot 33, and an externally threaded cylindrical outer surface 32 for receiving the sleeve 80. The front portion 26 includes a pair of legs 34 defining a space 40 between the legs 34. Each leg 38 has a semi-cylindrical rear outer surface 36, a tapered front outer surface 38, and an inner surface 42 with an axially extending concave recess 44. The cylindrical bore 31, the transverse slot 33, and the space 40 between the legs 38 together define a front opening that is configured to receive the gripping assembly 50, as described further below.

Figure 4B:
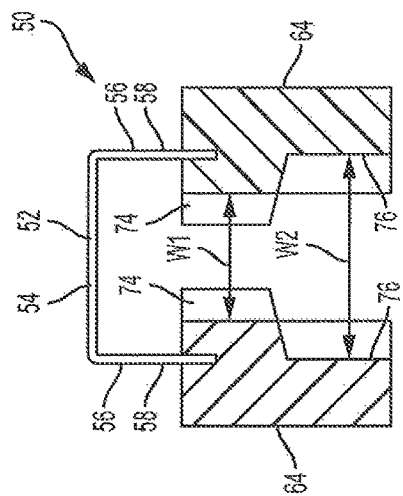
FIG. 4B is a cross-section view of the gripping mechanism of FIG. 4A.
Figure 4C:
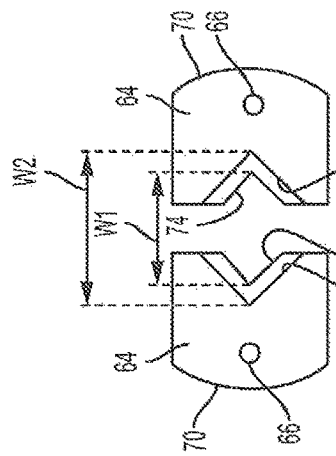
FIG. 4C is a rear view of the jaws of the gripping mechanism of FIG. 4A.
Figure 4A:
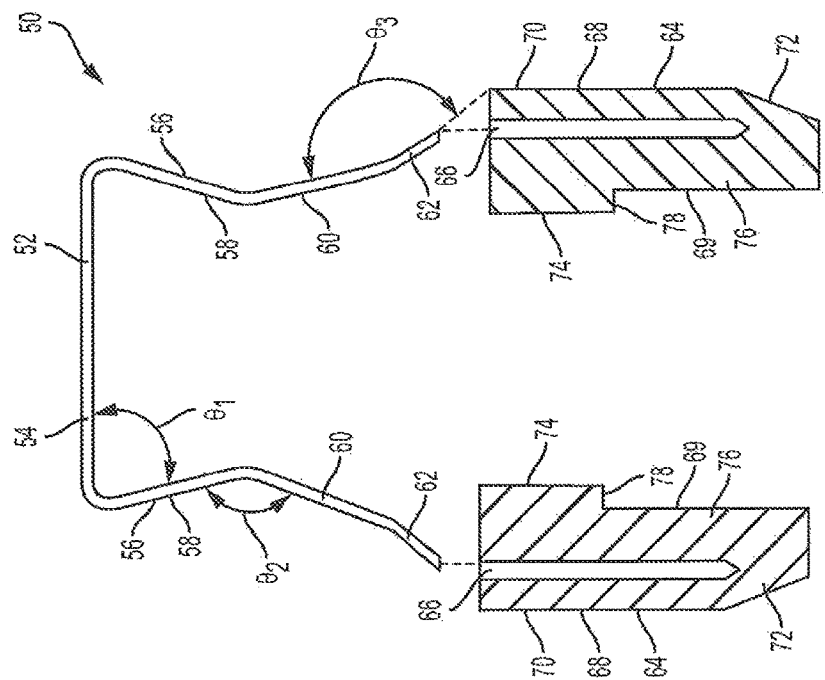
FIG. 4A is an exploded side view of a gripping mechanism of the tap holder of FIG. 1.

Referring also FIG. 4A-4C, the gripping assembly 50 includes a generally U-shaped wire spring 52 having a cross-bar 54 and a pair of legs 56 extending axially forward of the cross-bar 54. Each leg 56 includes a first portion 58 extending axially forward and radially inward from the cross-bar 54 at a first acute angle θ1 (e.g., approximately 68° to approximately 74°), a second portion 60 extending axially forward and radially outward from the first portion 58 at a second obtuse angle θ2 (e.g., approximately 136° to approximately 150°), and a third portion 62 extending axially forward and radially outward from the second portion 62 at a third obtuse angle θ3 (e.g., approximately 155° to approximately 165°).

The gripping assembly 50 also includes a pair of jaws 64 each having an axial bore 66 for receiving the second portion 60 and the third portion 62 of each of the legs 56. The third portion 62 is angled radially outward from the second portion 62 to help retain the jaws 64 on the legs 56. Each jaw 64 also includes an outer wall 68 with a semi-cylindrical rear portion 70 and a tapered front portion 72, and an inner wall 69 with a first polygonal (e.g., V-shaped) gripping surface 74 and a second polygonal (e.g., V-shaped) gripping surface 76, separated by a step 78. The first and second gripping surfaces 74, 76 of the respective jaws 64 face one another to define a first width W1 (e.g., approximately 3.68 mm to 5.80 mm) and a second larger width W2 (e.g., approximately 5.80 mm to 10.32 mm) therebetween (with the widths W1, W2 measured from the apexes of the V-shapes).

Figure 5B:
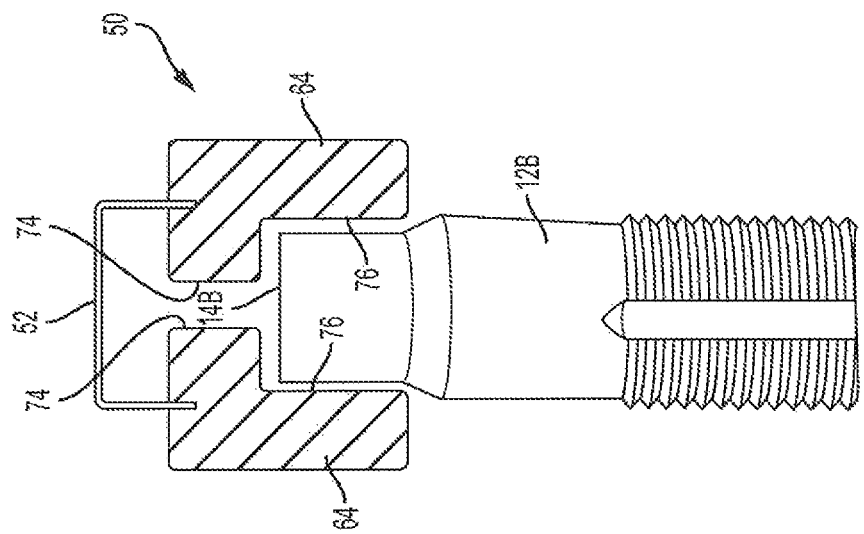
FIGS. 5A and 5B are schematic views showing the jaws of the tap holder of FIG. 1 gripping taps having different head sizes.
Figure 5A:
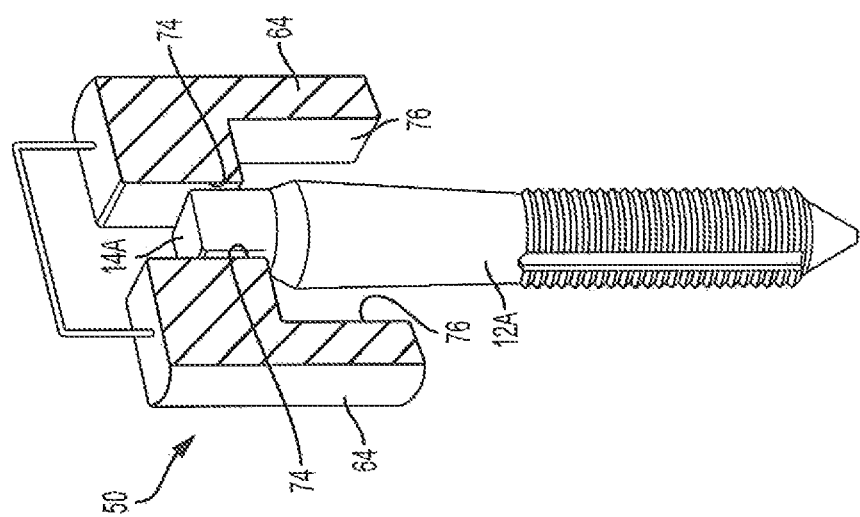

Referring also to FIGS. 5A and 5B, the first gripping surfaces 74 with a smaller width W1 are adapted to clamp taps 12A having polygonal heads 14A with a first range of smaller widths (e.g., less than or equal to approximately 5 mm, such as approximately 2 mm to 5 mm, measured corner to corner). The second gripping surfaces 76 with a larger width W2 are adapted to clamp taps 12B having polygonal heads 14B with a second range of larger maximum widths (e.g., greater than or equal to approximately 4 mm, such as approximately 4 mm to 7 mm, measured corner to corner). It should be noted that the first range of tap sizes of taps may overlap partially or may be distinct from the second range of tap sizes.

Figure 6:
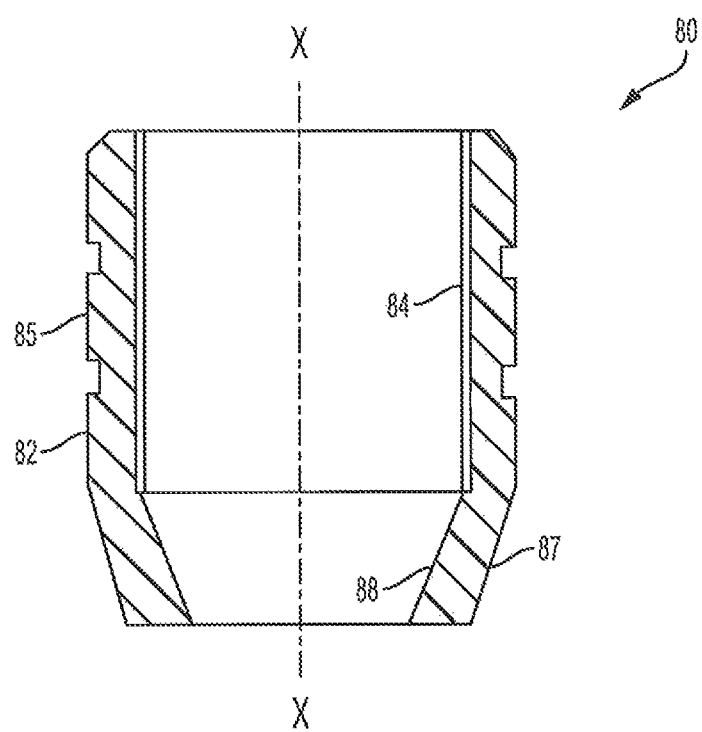
FIG. 6 is a cross-sectional view of an outer sleeve of the tap holder of FIG. 1.

Referring also to FIG. 6, the outer sleeve 80 includes a generally cylindrical rear portion 82 with an internally threaded bore 84 configured to be threadably received over the externally threaded cylindrical outer surface 32 of the body 20, and a knurled external surface 85 configured to be gripped by a user's fingers. The outer sleeve 80 also has a frustronconical front portion 86 with a smooth outer surface 87 and a tapered inner surface 88 configured to abut against the tapered front portions 72 of the outer walls 68 of the jaws 64, and against the tapered front outer surfaces 38 of the legs 26.

The tap holder 10 is assembled by inserting the legs 56 of the spring 52 into the bores 66 in the jaws 68 to form the gripping assembly 50. The gripping assembly 50 is received in the front opening of the body 20 by inserting the cross bar 54 of the spring 52 into the transverse slot 33 with the jaws 68 received in the spaces 40 between the legs 34. The adjustment sleeve 80 is received over the jaws 40 and legs 34 and threaded onto the externally threaded outer surface 32 of the body 20. Finally, the handle 90 may be optionally inserted into the transverse bore 30 in the body and retained by the detent pin 29 at one of the plurality of annular recesses 94 in the handle 90.

In use, a tap 12 is inserted into the front opening of the body 20 between the jaws 64 and the legs 34 of the body 20. Depending on the size of the head 14 of the tap 12, the head 14 may be received between the first gripping surfaces 74 of the jaws 64 (for heads having a smaller width) and/or between the second gripping surfaces 76 of the jaws (for heads having a larger width). The sleeve 80 may then be rotated along the threaded surfaces 32, 84 so that the tapered internal surfaces 88 of the sleeve 80 push against the tapered external surfaces 72 of the jaws 64 to move the jaws 64 axially forward and radially inward towards one another to tighten the grip of the jaws 64 about the head 14 of the tap 12. Once the tap 12 is securely retained between the jaws 64, the tap holder 10 can be rotated to cause the tap 12 to cut a threaded hole in a workpiece. The tap holder 10 may be rotated manually (e.g., by grasping the handle 90 and manually rotating the holder 10, or by attaching a manual ratchet wrench to the socket 28), or by using a power tool (e.g., a drill, a screwdriver, an impact driver, or an impact wrench) by coupling a working end of the power tool to the socket 28. Once a hole has been formed, the tap 12 may be removed from the tap holder 10 by rotating the sleeve 80 in the opposite direction to loosen the grip of the jaws 64 on the head 14 of the tap 12.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. For example, in other implementations, the tap holder may have a different number of jaws (such as three or four), the polygonal geometry between the jaws may be a different (e.g., hexagonal or pentagonal), and the polygonal geometry of the socket may be different (e.g., hexagonal or pentagonal). The jaws may each include more than two gripping surfaces (e.g., three or four gripping surfaces) of different widths to facilitate grasping a wider range of tap head sizes. These and other implementations are within the scope of the following claims.

What is claimed is:

1. A tap holder comprising:
    a body extending along an axis and having a front end portion defining a front opening and an externally threaded portion;
    a gripping assembly including a U-shaped spring having a cross-bar and first and second legs extending from ends of the cross-bar, a first jaw mounted to the first leg, and a second jaw mounted to the second leg, each jaw having a tapered outer wall and an inner wall defining first and second gripping surfaces with the inner walls of the jaws facing each other; and
    a sleeve having an internally threaded bore threadably received on the externally threaded portion of the body, and an inner tapered surface configured to abut the tapered outer walls of the first and second jaws, such that as the sleeve is rotated relative to the body, a distance between the first and second gripping surfaces may be adjusted for gripping a tap between the inner walls of the first and second jaws,
    wherein each of the inner walls includes first and second gripping surfaces, the first gripping surfaces defining a first width therebetween for gripping taps having a first range of head sizes, and the second gripping surfaces defining a larger second width therebetween for gripping taps having a second, different range of head sizes, and
    wherein each leg has a first section extending axially forward and radially inward from the cross-bar at a first angle, a second section extending axially forward and radially outward from the first section at a second angle, and a third section extending axially forward and radially outward from the second section at a third angle, and
    wherein the second gripping surfaces are positioned closer to the front end of the body and further from the cross-bar than the first gripping surfaces.

2. The tap holder of claim 1, further comprising a rod-shaped handle and a cross-bore defined in the body transverse to the axis for receiving the handle.

3. The tap holder of claim 2, wherein the handle includes a plurality of recesses along its length and the body includes a detent projecting into the cross-bore to engage the recesses to adjust a transverse position of the handle relative to the body.

4. The tap holder of claim 1, wherein the body defines an axial socket in a rear end of the body for receiving a driving tool.

5. The tap holder of claim 4, wherein the socket has a polygonal cross-section.

6. The tap holder of claim 1, wherein the spring comprises a wire spring.

7. The tap holder of claim 1, wherein each of the first gripping surfaces and each of the second gripping surfaces are V-shaped for gripping square heads of taps therebetween.

8. The tap holder of claim 1, wherein a step is defined between each of the first gripping surfaces and the second gripping surfaces.

9. The tap holder of claim 1, wherein the first gripping surfaces are configured to hold taps having head widths of less than or equal to 5 mm.

10. The tap holder of claim 9, wherein the small width gripping surfaces are configured to hold taps having head widths of 2 mm to 5 mm.

11. The tap holder of claim 9, wherein the second gripping surfaces are configured to hold taps having head widths of greater than or equal to 4 mm.

12. The tap holder of claim 11, wherein the second gripping surfaces are configured to hold taps having head widths of 4 mm to 7 mm.

13. A tap holder comprising:
a body extending along an axis and having a front end portion defining a front opening and an externally threaded portion;
a gripping assembly including a generally U-shaped wire spring having a cross-bar and first and second legs at ends of the cross-bar, a first jaw mounted to the first leg, and a second jaw mounted to the second leg, each jaw having a tapered outer wall and an inner wall with the inner walls of the jaws facing each other; and
a sleeve having an internally threaded bore threadably received on the externally threaded portion of the body, and an inner tapered surface configured to abut the tapered outer walls of the first and second jaws, such that as the sleeve is rotated relative to the body, a distance between the first and second gripping surfaces may be adjusted for gripping a tap between the inner walls of the first and second jaws,
wherein each leg has a first section extending axially forward and radially inward from the cross-bar at a first angle a second section extending axially forward and radially outward from the first section at a second angle, and a third section extending axially forward and radially outward from the second section at a third angle, and
wherein each of the inner walls includes first and second gripping surfaces, the first gripping surfaces each defining a first width threbetween and the second gripping surfaces defining a larger second width therebetween, the second gripping surfaces positioned closer to the front end of the body and further from the cross-bar than the first gripping surfaces.

14. The tap holder of claim 13, wherein the first gripping surfaces are configured for gripping taps having a first range of head sizes, and the second gripping surfaces are configured for gripping taps having a second, different range of head sizes.

15. The tap holder of claim 14, wherein each of the first gripping surfaces and each of the second gripping surfaces are V-shaped for gripping square heads of taps therebetween.

\* \* \* \* \*